US005843879A

United States Patent [19]

[11] Patent Number: 5,843,879

Matsunaga et al.

[45] Date of Patent: Dec. 1, 1998

[54] BLEACHING ACTIVATOR GRANULATE

[75] Inventors: Satoshi Matsunaga; Hiroshi Kimura; Tuneharu Mukaiyama; Toshiyuki Ishikawa, all of Tokyo, Japan

[73] Assignee: Lion Corporation, Tokyo, Japan

[21] Appl. No.: 772,901

[22] Filed: Dec. 24, 1996

[30] Foreign Application Priority Data

Feb. 6, 1996 [JP] Japan .................................... 8-019710

[51] Int. Cl.$^6$ .............................. C09K 3/00; C11D 7/38; C11D 7/54; B29C 67/00

[52] U.S. Cl. .................... 510/312; 252/186.38; 264/109; 264/117; 264/118

[58] Field of Search ......................... 252/186.38, 186.25; 510/312, 313, 314; 264/128, 122, 118, 117, 109

[56] References Cited

U.S. PATENT DOCUMENTS

| | | | |
|---|---|---|---|
| 4,422,950 | 12/1983 | Kemper et al. | 252/186.38 |
| 4,444,674 | 4/1984 | Gray | 252/186.27 |
| 4,853,143 | 8/1989 | Hardy et al. | 252/186.25 |
| 5,002,687 | 3/1991 | Roberts et al. | 510/306 |
| 5,002,691 | 3/1991 | Bolkan et al. | 252/186.25 |
| 5,534,195 | 7/1996 | Chapman et al. | 252/186.26 |

FOREIGN PATENT DOCUMENTS

| | | |
|---|---|---|
| 61-111400 | 5/1986 | Japan . |

*Primary Examiner*—Joseph D. Anthony
*Attorney, Agent, or Firm*—Burns, Doane, Swecker & Mathis, LLP

[57] ABSTRACT

A bleaching activiator granulate produced by granulating (A) a bleaching activator selected from alkylcarbonyloxybenzene carboxylic acids, alklcarbonyloxybenzene sulfonic acids and salts thereof, and (B) an α-olefinsulfonate with (C) a water-soluble binder, which makes it possible to provide bleaching activator granulate having improved solubility and storability.

16 Claims, No Drawings

BLEACHING ACTIVATOR GRANULATE

BACKGROUND OF THE INVENTION

The present invention relates to bleaching activator granulate for activating peroxide bleaching agents such as percarbonates.

Bleaching agents and bleaching detergents for clothes now available on the market contain particularly sodium percarbonate or sodium perborate as a bleaching base. However, such a base has come to be used in combination with an organic peracid precursor of N-acyl or alkanoyloxybenzene type, since a sufficient bleaching function cannot be obtained with only the base. Such a base reacts with a hydrogen peroxide compound such as sodium percarbonate to form an organic peracid having a high bleaching effect for effectively removing stains such as food stains from clothes or for bleaching yellowed clothes.

Recently, a bleaching activator of alkanoyloxybenzene type having a high bleaching effect even in a low concentration began being incorporated into detergents. Such a compound should be granulated by a certain method, since it is easily hydrolyzed in the presence of an alkali component in the detergent. Japanese Patent Unexamined Published Application (hereinafter referred to as "J. P. KOKAI") No. Sho 61-111400 discloses a technique of coating the surface of long-chain sodium alkanoyloxybenzenesulfonate particles with a neutral or acidic, water-soluble inorganic hydrate such as Na sulfate or acidified borax to improve the storabiity and water dispersibility of the particles. Although acidic substances are preferred from the viewpoint of the storability, bleaching activators having a phenol ester group have problems that the solubility thereof is not easily improved by only granulating them with PEG or the like or by coating them with an acidic or neutral salt.

SUMMARY OF THE INVENTION

An object of the present invention is to provide bleaching activator granulate having improved solubility and storability.

The present invention has been completed on the basis of a finding that the above-described problem can be efficiently solved by granulating a specified organic bleaching activator with a water-soluble binder in the presence of an α-olefinsulfonate.

Namely, the present invention provides bleaching activator granulate produced by granulating a bleaching activator of the following general formula (I) or (II):

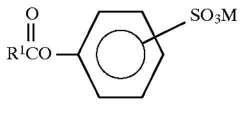
(I)

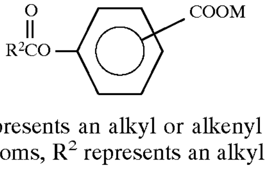
(II)

wherein $R^1$ represents an alkyl or alkenyl group having 10 to 15 carbon atoms, $R^2$ represents an alkyl or alkenyl group having 7 to 13 carbon atoms, an M represents a salt-forming cation or hydrogen and (B) a α-olefinsulfonate with (C) a water-soluble binder.

DETAILED DESCRIPTION OF THE PREFERRED EMDODIMENTS

The bleaching activator used in the present invention is represented by the above general formula (I) or (II). Although the alkyl and alkenyl groups in the formulae (I) and (II) may be linear or branched ones, the linear ones are preferred. M in the above formulae is preferably an atom or group which makes the bleaching activator soluble in water, such as hydrogen, an alkali metal, e. g. sodium or potassium, ammonium or an amine, e. g. an alkanolamine. In these atoms and groups, the alkali metals are preferred. Although SO3M and COOM groups in the formulae may be in the o-, m- or p-position, the p-position is preferred.

The bleaching activators produced by an ordinary process are in the form of platy crystals having a size of about 1000 to 100 μm. If necessary, the crystals may be pulverized to an average particle size of smaller than 300 μm, preferably about 200 to 100 μm. When the bleaching activator thus obtained has an average particle size of smaller than 300 μm, preferably about 200 to 100 μm, the activator can be used as it is. The starting bleaching activator having an average particle size of larger than 300 μm may also be used in the present invention.

The bleaching activators may be used either singly or in the form of a mixture of two or more of them in the present invention. Although the amount of the bleaching activator in the granules is not particularly limited, it is preferably 50 to 80% by weight (hereinafter referred to as "%") and more preferably 60 to 75%.

In the present invention, the bleaching activator is granulated together with an α-olefinsulfonate(AOS). Although the α-olefinsulfonate used herein may be any of those usually used for detergents, those in which the alkyl group has 12 to 22 carbon atoms are particularly preferred. The salts include those with alkali metals such as sodium and potassium, alkaline earth metals such as calcium and magnesium, ammonium and amines such as alkanolamines.

Although the amount of the α-olefinsulfonate in the granules is not particularly limited, it is preferably 1 to 20%, more preferably 2 to 10%.

The water-soluble binders usable in the present invention are preferably those which are solid at an ambient temperature and molten by heating. The water-soluble binders are preferably organic binders having a melting point of 25° to 100° C., desirably 25° to 80° C. and more desirably 40° to 80° C. Various water-soluble binders are usable so far as they satisfy these conditions. Among them, preferred binders are polyethylene glycols (PEG) having an average molecular weight of 300 to 30,000, desirably 1,000 to 20,000 and more desirably 4,000 to 20,000. It is also preferred to use a polyethylene glycol (average molecular weight: 300 to 3,000) adduct of nonionic surfactant. In particular, an ethylene glycol (3 to 80 mol, preferably 10 to 50 mol) adduct of an aliphatic alcohol (having 8 to 20 carbon atoms, preferably 10 to 18 carbon atoms) is preferred.

The solubility of the resultant granular bleaching activator can be improved by using the polyethylene glycol itself or the polyethylene glycol adduct of the nonionic surfactant selected from among the various water-soluble binders.

Although the amount of the water-soluble binder in the granules is not particularly limited, it is preferably 10 to 40%, more preferably 15 to 30%.

The granulation method is not particularly limited in the present invention so far as it comprises granulating (A) the bleaching activator of the general formula (I) or (II) and (B) the α-olefinsulfonate with (C) the water-soluble binder. The granulate produced by a method having a step of heating the water-soluble binder (C) to melt are preferred.

The granulate can be produced by a method disclosed in JP Kokai Nos. 59-13529 and 58-11597, and specification of Japanese Patent Application No. Hei 7-165389 and the like, disclosure of which is incorporated herein by reference.

In particular, in the production of the bleaching activator granulate with the water-soluble binder, it is preferred that the bleaching activator particles, α-olefinsulfonate and water-soluble binder are fed into a screw-type kneader having a barrel preheated to a temperature above the melting point of the water-soluble binder and that the temperature in the barrel is kept above the melting point of the water-soluble binder while kneading. The temperature in the barrel is kept not below the melting point of the water-soluble binder and not above the decomposition point of the bleaching activating agent. The temperature is preferably 40° to 130° C. , more preferably 60° to 100° C. Although it is possible to keep the temperature in only the kneading part of the barrel in this range, it is more preferred that the temperature in the whole barrel is kept in this range. It is also preferred that the temperature of around the inlet of the barrel for the bleaching activator particles and water-soluble binder is kept in this range.

It is preferred in the present invention to mix the bleaching activator particles, α-olefinsulfonate and water-soluble binder before feeding them into the screw-type kneader and to feed the resultant mixture into a hopper of the kneader. Of course, they can be fed into the hopper separately from each other.

After kneading the bleaching activator particles, α-olefinsulfonate and water-soluble binder in the screw-type kneader, the obtained mixture can be fed into an extruder to extrude it through a die, thereby obtaining granulate. The kneaders include, for example, KRC kneader (a product of Kurimoto, Ltd.), and the extruders include, for example, Pelleter Double (a product of Fuji Paudal Co., Ltd.).

It is preferred to conduct the process ranging from the kneading to extrusion using only one kneading machine of extruder type. Particularly preferred kneading machine of extruder type is Extrude-O-Mix (a product of Hosokawa Micron Co., Ltd.) which has a baffle and porous plate in a barrel in its kneading part to improve the kneading effect and also to make the granulation possible. It is also preferred to use a double-shaft kneading extruder such as KEX double shaft kneading extruder (a product of Kurimoto, Ltd.).

It is preferred in the present invention to obtain noodle-shaped granulate having a diameter of 0.3 to 3 mm by using a die for producing the granules having a diameter of 0.3 to 3 mm in the extrusion. Although the length of the granules is not particularly limited, it is preferred to obtain granulate having a length of about 0.5 to 50 mm by cutting the noodle-shaped product discharged from the extruder or without cutting it.

The granulate of the present invention may further contain additives such as a colorant and flavor in addition to the above-described components.

The storability and fluidity of the granulate can be improved by adhering an aluminosilicate on the surface thereof in the present invention. The adhesion can be conducted by any unlimited method such as physical adsorption of chemical adsorption method so far as the aluminosilicate is brought into contact or bonded with at least a part of the granule surface. Various aluminosilicates are usable herein. Among them, zeolite A, zeolite P, etc. are preferred. The average granulate diameter is preferably about 1 to 10 μm.

The aluminosilicate is used in an amount of preferably 1 to 10 parts by weight, more preferably 2 to 8 parts by weight, for 100 parts by weight of the granulate.

The aluminosilicate can be easily adsorbed on the surfaces of the granulate by an ordinary method such as a method wherein the granulate are mixed with the aluminosilicate in a blender or the like or a method wherein the granulate are further broken and granulated in the presence of the aluminosilicate.

The granulate of the present invention are widely usable as an activator for a peroxide bleaching agent such as a percarbonic acid salt for bleaching clothes, houses, tablewares, pulps, etc. The granulate can be incorporated into detergents together with the peroxide bleaching agent.

A bleaching agent or detergent can be easily produced by mixing the bleaching activator granulate of the present invention with bleaching components and/or detergent components. The bleaching components usable herein include those described in J. P. KOKAI No. Sho 61-11996 such as a peroxide bleaching agent, e. g. a percarbonic acid salt, surfactant, inorganic salt, enzyme, flavor and colorant. The detergent components include, for example, those described in J. P. KOKAI No. Hei 5-179299.

According to the present invention, there are provided the bleaching activator granulate excellent in the solubility and storability is provided. Thus, a bleaching agent or a detergent containing the bleaching activator granulate is easily soluble in water, easily usable and excellent in the storability, and exhibits an excellent bleaching effect.

The following Examples will further illustrate the present invention.

EXAMPLE 1

A bleaching activator having an average particle diameter of 200 μm as shown in Table 1, AOS (Lipolan PJ 400 having 14 carbon atoms; a product of Lion Corporation) and PEG 6000 (molecular weight: 6,000) all in the form of powders were fed into S-1KRC kneader (a product of Kurimoto, Ltd.) and kneaded under heating to about 65° C. The kneaded mixture was then passed through a mesh plate having about 20 to 40 holes having a diameter of 0.8 mm to obtain needle-shaped granules having a length of 10 to 100 mm. The granules were cooled to 40° C. or below by blowing cold air and then broken by slowly rotating them in a Henshel mixer to obtain rod-shaped bleaching activator granulate having a diameter of 0.8 mm and a length of 0.5 to 7 mm.

TABLE 1

| Bleaching activator No. | R | X |
|---|---|---|
| a | $C_{11}H_{23}$ | $SO_3Na$ |
| b | $C_{13}H_{27}$ | $SO_3Na$ |
| c | $C_{15}H_{31}$ | $SO_3Na$ |
| d | $C_7H_{15}$ | COONa |
| e | $C_9H_{19}$ | COONa |
| f | $C_{11}H_{23}$ | COONa |
| g | $C_7H_{15}$ | COOH |
| h | $C_9H_{19}$ | COOH |
| i | $C_{11}H_{23}$ | COOH |
| j | $C_{19}H_{39}$ | $SO_3Na$ |
| k | $CH_3$ | COOH |

The bleaching activators shown in the above Table are those represented by the following formula (III):

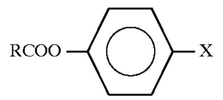

(III)

The solubility and storability of the bleaching activator granulate thus obtained were evaluated by methods described below.

Evaluation of solubility 3 liters of ion-exchanged water having a temperature of 15° C., was fed into a 0.5 liter mini-mini washing machine (a product of Matsushita Electric Industrial Co., Ltd.). Sodium carbonate and sodium percarbonate were added to the water so that the concentrations of them would be 200 ppm and 50 ppm, respectively. 20 ppm of the bleaching activator granulate obtained as described above was added to the mixture. After stirring for 10 minutes, a small amount of the solution was taken with a microsyringe. The sum of the dissolved bleaching activator and the decomposed hydroxybenzene derivative residue was determined by high-performance liquid chromatography at a wave length of 230 nm, and the solubility of the bleaching activator was calculated.

Evaluation of storage stability (storability)

10 g of a bleaching detergent composition shown in Table 2 was fed into a PS-4 glass bottle and capped. After keeping the bottle in a 45° C.–25° recycle chamber for two weeks, the remaining rate of the activator was determined by high-performance liquid chromatography at a wave length of 230 nm.

TABLE 2

Detergent composition

| | (wt. %) |
|---|---|
| Potassium alkyl($C_{10-14}$)benzenesulfonate | 15 |
| Potassium α-olefin ($C_{14-18}$)sulfonate | 5 |
| α-SF-Na | 10 |
| Soap (sodium salt of $C_{14-18}$ saturated fatty acid) | 5 |
| Nonionic surfactant | 5 |
| Zeolite A | 25 |
| Potassium carbonate | 5 |
| Sodium silicate | 5 |
| Alkali protease | 1 |
| Sodium percarbonate | 10 |
| Bleaching activator granulate | 3 |
| Fluorescent brightener | 0.3 |
| Flavor | 0.2 |
| Water | 6 |
| Sodium carbonate | balance |

In the above Table, α-SF-Na indicates sodium sulfonate of a methyl ester of saturated fatty acid having an alkyl chain length: $C_{14}/C_{16}$ of 2/8, the nonionic surfactant indicates an alkyl ($C_{13}$) ether ethoxylate (average addition molar number of ethylene oxide: 15), the alkali protease indicates Sabinase 6.0 T (a product of NOVO Nordisk) and the fluorescent brightener indicates Tinopal CBS-X (a product of Ciba-Geigy).

The functions thus obtained are shown in Table 3.

TABLE 3

Evaluation of bleaching activator granulate

| Granule No. | Bleaching activator No. | AOS (%) | PEG (%) | Solubility (%) | Stability (%) |
|---|---|---|---|---|---|
| 1 | a | 5 | 25 | 92 | 95 |
| 2 | b | 5 | 25 | 91 | 95 |
| 3 | c | 10 | 20 | 90 | 93 |
| 4 | d | 15 | 15 | 100 | 96 |
| 5 | e | 10 | 20 | 100 | 95 |
| 6 | f | 10 | 20 | 99 | 94 |
| 7 | g | 3 | 25 | 100 | 99 |
| 8 | h | 5 | 25 | 100 | 97 |
| 9 | i | 5 | 27 | 92 | 95 |
| 10* | j | 0 | 29 | 5 | 99 |
| 11* | k | 10 | 20 | 100 | 62 |

In Table 3, the bleaching activators 1 to 9 are the products of the present invention, and 10* and 11* are comparative ones.

EXAMPLE 2

A bleaching activator shown in Table 1, an α-olefinsulfonate(AOS) and polyethylene glycol (PEG) #6000 (molecular weight: 6000) in relative amounts shown in Table 4 were fed into Extrude-O-Mix EM-6 (a product of Hosokawa Micron Co., Ltd.), and kneaded and extruded to obtain noodle-shaped products having a diameter of 0.8 mm. The extruded product (60° C. ) was fed into Fitz mill DKA-3 (a product of Hosokawa Micron Co., Ltd.) in the same direction as that of the granules obtained by the kneading/extrusion. An assistant was also fed thereinto and the whole mixture was pulverized to obtain the granules. The granules were then sieved to obtain rod-shaped granules having a diameter of 0.8 mm and length of 0.5 to 7 mm for the detergent and those having an average diameter of 600 μm for the bleaching agent.

TABLE 4

Composition of granular bleaching activator

| Granule | Bleaching activator | | AOS | PEG | Assistant | |
|---|---|---|---|---|---|---|
| No. | No. | % | % | % | % | Kind |
| 21 | a | 70 | 5 | balance | 3 | A |
| 22 | b | 75 | 8 | balance | 3 | A |
| 23 | e | 70 | 5 | balance | 2 | A |
| 24 | f | 65 | 3 | balance | 7 | A |
| 25 | g | 70 | 3 | balance | 5 | A |
| 26 | h | 70 | 5 | balance | 5 | A |
| 27 | i | 70 | 8 | balance | 5 | A |
| 28 | h | 65 | 3 | balance | 5 | B |
| 29 | h | 70 | 3 | balance | 5 | B |
| 30 | h | 75 | 5 | balance | 5 | B |
| 31 | i | 65 | 5 | balance | 5 | B |
| 32 | i | 65 | 5 | balance | 5 | B |
| 33 | j | 70 | 5 | balance | 3 | C |
| 34 | k | 70 | 10 | balance | 5 | A |

AOS: Lipolan PJ 400 (a product of Lion Corporation)
A: A-type zeolite (average particle diameter: 2 μm, a product of Mizusawa Industrial Chemicals Ltd.)
B: P-type zeolite (average particle diameter: 3 μm)
C: calcium carbonate (first grade reagent, average particle diameter: 5 μm, a product of Junsei Kagaku).

The storability and fluidity (angle of repose) of each of the granular bleaching activators thus obtained were determined as described below.

Evaluation of storage stability (storability)

The bleaching detergent composition shown in Table 2 or a bleaching composition shown in Table 5 was prepared using the above-described bleaching activator granulate. 1200 g of the bleaching detergent composition was fed into a Package vessel-for-detergent, and 600 g of the bleaching composition was fed into a bottle-for-bleaching agent. They were stored in a 45° –25° C. recycle chamber for 2 weeks. Thereafter, the remaining rate of the bleaching activator was determined by high-peformance liquid chromatography at a wave length of 230 nm.

Evaluation of angle of repose

The sample used for the storability test was cooled to room temperature, and the angle of repose thereof was determined to evaluate the fluidity thereof.

The results are summarized in Tables 6 and 7.

TABLE 5

| Bleaching composition | |
|---|---|
| Component | Wt. % |
| Sodium percarbonate | 50 |
| Enzyme | 1.0 |
| Flavor | 0.1 |
| Sodium bicarbonate | 1 |
| Sodium carbonate | balance |
| Granular bleaching activator | 6 |

Enzyme: Durazyme 6.0T (a product of Novo Industry)

TABLE 6

Results of evaluation of function of bleaching detergent composition

| | Granular bleaching activator No. | Degree of repose (°) | Stability % |
|---|---|---|---|
| Present invention | | | |
| 1 | 21 | 40 | 97 |
| 2 | 22 | 35 | 99 |
| 3 | 23 | 35 | 98 |
| 4 | 24 | 40 | 99 |
| 5 | 25 | 40 | 98 |
| 6 | 26 | 40 | 99 |
| 7 | 27 | 40 | 100 |
| Comparative | | | |
| 1 | 33 | 55 | 95 |
| 2 | 34 | 60 | 73 |

TABLE 7

Results of evaluation of function of bleaching composition

| | Bleaching activator granulate No. | Degree of repose (°) | Stability % |
|---|---|---|---|
| Present invention | | | |
| 8 | 21 | 40 | 98 |
| 9 | 22 | 35 | 100 |
| 10 | 23 | 40 | 100 |
| 11 | 24 | 40 | 100 |
| 12 | 25 | 35 | 99 |
| 13 | 26 | 40 | 99 |
| 14 | 27 | 40 | 99 |
| 15 | 28 | 40 | 100 |
| 16 | 29 | 35 | 100 |
| 17 | 30 | 35 | 100 |
| 18 | 31 | 40 | 100 |
| 19 | 32 | 40 | 100 |
| Comparative | | | |
| 3 | 33 | 60 | 98 |

What is claimed is:

1. Bleaching activator granulate produced by granulating (A) a bleaching activator of the following general formula (I) or (II):

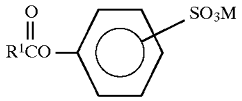

(I)

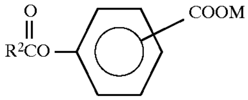

(II)

wherein $R^1$ represents an alkyl or alkenyl group having 10 to 15 carbon atoms, $R^2$ represents an alkyl or alkenyl group having 7 to 13 carbon atoms, and M represents a salt-forming cation or hydrogen and (B) an α-olefinsulfonate with (C) a water-soluble binder.

2. The bleaching activator granulate according to claim 1, wherein the bleaching activator is one represented by the general formula (I).

3. The bleaching activator granulate according to claim 1, wherein the bleaching activator is one represented by the general formula (II).

4. The bleaching activator granulate according to claim 1, wherein the α-olefinsulfonate contains an alkyl group having 12 to 22 carbon atoms.

5. The bleaching activator granulate according to claim 1, wherein the water-soluble binder is an organic binder having a melting point of 25° to 100° C.

6. The bleaching activator granulate according to claim 1, wherein the water-soluble binder is a polyethylene glycol having an average molecular weight of 300 to 30,000.

7. The bleaching activator granulate according to claim 1, wherein the water-soluble binder is a polyethylene glycol (average molecular weight: 300 to 30,000) adduct of a nonionic surfactant.

8. The bleaching activator granulate according to claim 1, wherein an amount of the bleaching activator is 50 to 80% by weight, that of the α-olefinsulfonate is 1 to 20% by weight and that of the water-soluble binder is 10 to 40% by weight.

9. The bleaching activator granulate according to claim 1, wherein the granulate have a length of 0.5 to 50 mm.

10. The bleaching activator granulate according to claim 1, wherein an aluminosilicate is attached to the surface of the granules.

11. The bleaching activator granulate according to claim 1, wherein an amount of the aluminosilicate is 1 to 10 parts by weight for 100 parts by weight of the granules.

12. The bleaching activator granulate according to claim 1, wherein the water-soluble binder is an organic binder having a melting point ranging from 40° to 80° C.

13. Bleaching activator granulate having a length of 0.5 to 50 mm, which is produced by granulating (A) 50 to 80% by weight of a bleaching activator of the following general formula (I) or (II):

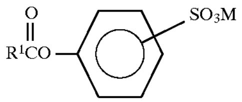

(I)

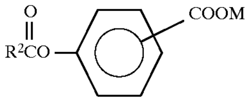

(II)

wherein $R^1$ represents an alkyl or alkenyl group having 10 to 15 carbon atoms, $R^2$ represents an alkyl or alkenyl group having 7 to 13 carbon atoms, and M represents a salt-forming cation or hydrogen and (B) 1 to 20% by weight of an α-olefinsulfonate acid salt containing an alkyl group having 12 to 22 carbon atoms with (C) 10 to 40% by weight of a water-soluble organic binder having a melting point of 25° to 100° C.

14. The bleaching activator granulate according to claim 13, wherein an aluminosilicate is attached to the surface of the granules.

15. The bleaching activator granulate according to claim 14, wherein an amount of the aluminosilicate is 1 to 10 parts by weight for 100 parts by weight of the granules.

16. The bleaching activator granulate according to claim 14, wherein the water-soluble binder is an organic binder having a melting point ranging from 40° to 80° C.

* * * * *